United States Patent [19]

Gazard et al.

[11] Patent Number: 4,502,934
[45] Date of Patent: Mar. 5, 1985

[54] ELECTRODE COMPRISING AN ELECTROCHROME POLYMER FILM AND A DISPLAY DEVICE USING SUCH AN ELECTRODE

[75] Inventors: Maryse Gazard; Gérard Tourillon; Francis Garnier, all of Paris, France

[73] Assignee: Thomson-CSF, Paris, France

[21] Appl. No.: 499,789

[22] Filed: May 31, 1983

[30] Foreign Application Priority Data

Jun. 1, 1982 [FR] France ................. 82 09512

[51] Int. Cl.³ .............. C25B 9/00; G02F 1/01
[52] U.S. Cl. ................. 204/242; 204/290 R; 350/357
[58] Field of Search .......... 350/357; 252/408; 204/290 R, 242

[56] References Cited

U.S. PATENT DOCUMENTS 4,304,465 12/1981 Diaz .................... 350/357

FOREIGN PATENT DOCUMENTS 27855 5/1981 European Pat. Off. .
36118 9/1981 European Pat. Off. .
94536 8/1969 France .

OTHER PUBLICATIONS

Extended Abstracts No. 427, 1980, A. F. Diaz et al., "Electro-Synthesis and Study of Conducting Organic Polymers for Electrode Applications."
IBM Technical Disclosure Bulletin, vol. 24, No. 11A, Apr. 1982, "Poly-p-Nitrophenylpyrrole Films as Electrodes for Batteries."
Chemical Abstracts, vol. 93, 1980, 56812d, A. F. Diaz et al.: "Chemical Modification of a Polypyrrole Electrode Surface."
Journal of Polymer Science, Polymer Letters Edition, vol. 18, 1980, Yamamoto et al., "Preparation of Thermostable and Electric-Conducting Poly(2,5-Thienylene)."
Chemical Abstracts, vol. 91, 1979, 141759v, Tourillon et al., "Electrochemical Doping of Poly(THF) Thin Films Deposited on the Platinum Electrode: XPS and SIMS."

*Primary Examiner*—John F. Niebling
*Attorney, Agent, or Firm*—Oblon, Fisher, Spivak, McClelland & Maier

[57] ABSTRACT

The invention relates to the elaboration of an electrode comprising an electrochrome polymer.

The invention provides an electrode coated with a polymer film obtained by electrochemical polymerization of a monomer M, said polymer corresponding to the general formula $(M^+X^-y)n$ where $X^-$ represents an anion coming from the electrolyte used for the polymerization, the monomer being either a substituted aromatic heterocycle with 5 links containing a single heteroatom, or an indole substituted on the phenyl nucleus, the substitutions being possibly groups of the alkyl, alkoxyl, hydroxyl, aryl, substituted aryl, halogene, trihalogenomethyl, cyano, amino or dialkylamino type.

24 Claims, 5 Drawing Figures

ELECTRODE COMPRISING AN ELECTROCHROME POLYMER FILM AND A DISPLAY DEVICE USING SUCH AN ELECTRODE

BACKGROUND OF THE INVENTION

1. Field of the Invention

The invention relates to an electrode coated with a new electroactive polymer obtained by electrochemical oxidization of a monomer and application thereof to electrochemical cells and more especially to electrochemical display systems.

2. Description of the Prior Art

Electrodes coated with a polymer film have already been produced, more especially for manufacturing electrochemical cells. Organic polymer eletrochromes are of great interest because they are easier to use than other types of electrochromes. Furthermore, by modifying the chemical structure of the polymer, the absorption spectra of the oxidized and reduced molecules may be modified. Electrochrome polymers in which the electrochrome group has been fixed by a chemical reaction to the chain of a polymer have already been described. Polymers soluble in organic solvents may be readily deposited on an electrode by conventional methods (by centrifugation or immersion). Depending on the nature of the electrochrome group, response times of the order of 100 ms may be obtained in display systems using these materials but their adhesion to the electrode is often limited.

Another process used for depositing thin polymer films on an electrode consists in electrochemically polymerizing the desired monomer. It is known to deposit, by anode oxidization, pyrrol and N substituted pyrrols on platinum or glass electrodes coated with a conducting oxide. In electrochemical display systems, these films may undergo oxidizing and reducing cycles with modification of the optical spectra. Although the electrodes coated with such polymers are advantageous because of the better adhesion of the thin electrochrom film, the materials have the drawback of being very sensitive to oxygen which promotes degradation thereof and reduces their life-span.

The invention, due both to Messrs F. GARNIER and G. TOURILLON of the Laboratoire de Photochimie Solaire of the C.N.R.S. and to Mlle GAZARD of THOMSON-CSF proposes palliating these disadvantages by providing an electrode coated with a polymer obtained by electrochemical polymerization of a monomer which belongs to a family allowing a product to be obtained with improved performances: reduced response time, great stability of the materials and improved life-span. In the case of using this electrode in an electrochemical display device, the color characterizing the display depends on the structure of the monomer and on the nature of the counter-ion.

SUMMARY OF THE INVENTION

The invention provides then an electrode comprising a conducting support coated with a polymer film obtained by electrochemical polymerization of at least one monomer M, said polymer corresponding to the general formula $(M^+X^-y)n$; $X^-$ representing an anion coming from the electrolyte used during said polymerization, y the anion proportion with respect to a mole of monomer and n the degree of polymerization; wherein said monomer has at least one aromatic heterocycle with 5 links, containing a single hetero-atom and is substituted by at least one group of the alkyl, alkoxyl, hydroxyl, aryl, substituted aryl, halogen, trihalogenomethyl, cyano, amino, or dialkylamino type.

The invention also relates to using such an electrode in electrochemical cells.

A further aim of the invention is to provide such an electrode for constructing an electrochemical display device.

BRIEF DESCRIPTION OF THE DRAWINGS

The invention will be better understood from the following description and the accompanying figures in which.

DESCRIPTION OF THE PREFERRED EMBODIMENTS

There will first of all be described the method for preparing the deposition of a polymer film on a conducting element then examples will be given describing some embodiments.

The monomers used for forming the polymer film have at least one aromatic heterocycle with 5 links containing a single hetero-atom. The monomer may be a substituted derivative in position 3, in position 4 or in position 3 and 4 of pyrrol, of thiophene or of furan. This may be an indole substituted on the phenol nucleus by 1 to 4 groups.

Polymerization of the monomer is carried out in an electrolysis cell containing the monomer dissolved in an organic solvent such as acetonitrile, tetrahydrofuran, methylene chloride or a water-acetonitrile mixture, in the presence of a conducting salt of formula $A^+X^-$. The cation $A^+$ may be an alkaline element, the $N(C_4H_9)_4^+$ ion, the $N(C_2H_5)_4^+$ ion or a similar compound. The $X^-$ anion may be an ion of the type

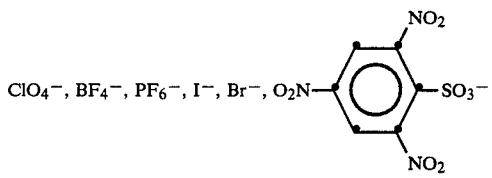

$ClO_4^-$, $BF_4^-$, $PF_6^-$, $I^-$, $Br^-$, $O_2N$— or a similar compound. The monomer concentration is between $5.10^{-3}$ and $10^{-1}$ mole/liter and the conducting salt concentration is between $10^{-2}$ and 1 mole/liter. The polymer is deposited on the anode in the form of an adhering film at a rate which depends on the monomer concentration in the solvent, on the potential of the anode and on the current between the anode and the cathode. The potential of the anode may be fixed with respect to a reference electrode or a potential difference may be imposed between the anode and the cathode.

The polymer film is deposited on a cathode formed by a metal plate which may be for example made from platinum or gold or by a glass plate on which a transparent conducting film has been deposited such as tin or indium oxide. The cathode or counter electrode may be a platinum or gold wire and the reference electrode a standard calomel electrode.

The polymer film formed on the surface of the anode contains a certain proportion of the anion coming from the electrolyte and its general formula may be written in the form $(M^+X^-y)n$, where M represents the monomer, $X^-$ the anion or counter-ion, y the anion proportion in the polymer with respect to a mole of monomer and n the degree of polymerization. In the above formula, y is a factor which may vary between 0.1 and 0.5. It is not possible to determine the value of the coefficient n because of the insolubility of the polymer. The polymer and the anion form a charge transfer complex whose conductivity varies between $10^{-2}$ and $100\Omega^{-1}\cdot cm^{-1}$.

Figure 1:
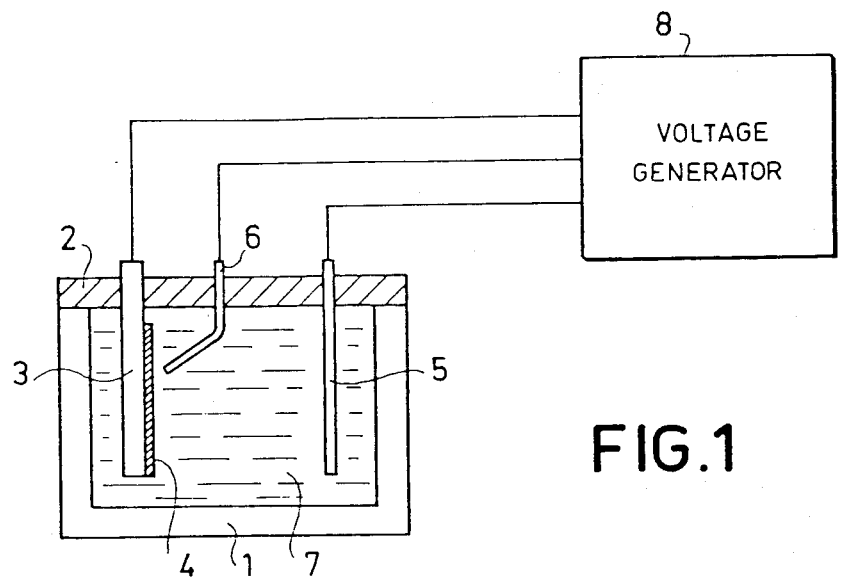
FIG. 1 is a sectional view of an electrochemical cell.

Such a polymer coating an electrode may undergo, in an electrochemical cell, oxido-reduction cycles accompanied by modification of the light absorption spectrum. The oxido-reduction cycles cause insertion and de-insertion phenomena of the counter-ions inside the polymer which modify the light absorption spectrum. It is particularly advantageous to use an electrode in accordance with the invention in an electrochemical cell comprising at least two electrodes, the working electrode and a counter-electrode, so as to form an electrochemical display device. This is what is shown in FIG. 1 which is a sectional view of an electrochemical cell. The cell is formed of a transparent container 1, made from glass for example, closed by a lid 2. Electrode 3, which is the working electrode, is coated with an electrochrome polymer film 4 of the invention. This film is deposited on electrode 3 in accordance with the above-described process and its thickness is between 0.1 and 0.5 micron. The counter-electrode 5 may be simply a platinum wire. It is possible to provide the system with a reference electrode 6 which may be a standard calomel electrode. The cell is filled with an electrolyte solution in an organic solvent 7, for example of the type which has served for producing the polymer film. The electrolyte is a conducting salt of the $A^+X^-$ type already described whose concentration in the solution is between $10^{-2}$ and 1 mole/liter. Electrodes 3, 5 and 6 are connected to a voltage generator 8. By varying the potential of the working electrode with respect to the reference electrode, by means of generator 8, modification of the color of the polymer film is caused. Variation of the potential difference between electrodes 3 and 6 caused by generator 8 depends on the nature of the polymer but does not generally depart from the range [−1.5 V, +1.5 V]. The charge amount required for oxidizing or for reducing the polymer depends on the thickness of film 4. It is between 1 and 50 $mC/cm^2$. Generator 8, through electrodes 3 and 5, allows the electrolysis current to pass through solution 7.

Each $(M^+X^-y)n$ polymer has an absorption spectrum for the reduced form and an absorption spectrum for the oxidized form. It is thus possible to obtain polychromatic display devices either by modifying for the same monomer M the nature of the counter-ion $X^-$ (by changing the nature of the electrolyte), or by modifying the structure of the monomer M. It is possible to obtain by the same methods polymer films formed from two or more basic monomers.

An electrochrome cell such as the one shown in FIG. 1 may operate by reflection or transmission. In the case of reflection operation, electrode 3 may be made from metal, for example from platinum. For transmission operation, a glass plate may be used on which a transparent conducting film has been deposited such as tin oxide or indium oxide. The reference electrode is placed so as not to disturb observation of the cell.

Examples of the process are given hereafter.

EXAMPLE 1

This example describes the typical manufacture of an electrochrome polymer in which the monomer is methyl-3-thiophene.

An electrolysis cell comprising three electrodes, the anode, the cathode and a reference electrode is filled with a solution containing $10^{-2}$ moles of methyl-3-thiophene and 0.1 mole of lithium perchlorate for a liter of acetonitrile. The anode is for example a glass plate on which has been deposited a conducting film such as tin oxide $SnO_2$ over an area of 1 $cm^2$. The cathode is in the form of a platinum wire. The solution is perfectly deoxygenated by sweeping with dry argon for at least half an hour.

The potential of the anode is fixed at 1.4 V with respect to the reference electrode. By establishing a potential difference between the anode and the cathode, electrolysis of the solution is caused and the anode is then coated with a polymer film dark blue in color and the thickness of which may reach 4000 Å after a minute. The polymer obtained by this method is poly methyl-3-thiophene which may be represented by the following formula, determined by microanalysis:

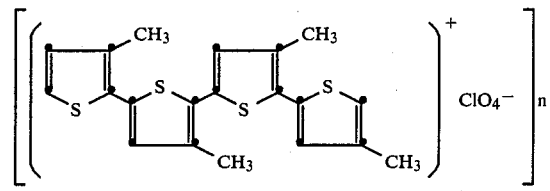

This polymer is stable in air and in a vacuum up to temperatures greater than 300° C. Its conductivity is between 10 and $100\Omega^{-1}\cdot cm^{-1}$.

The electrode coated with this polymer film is rinsed in acetonitrile then placed in another cell of the type shown in FIG. 1. This cell is filled with a solution containing 0.1 mole of lithium perchlorate per liter of acetonitrile. The film is reduced and re-oxidized if a voltage at first zero then equal to 0.8 V is applied between the working electrode (formed by the electrode coated with the polymer film) and the reference electrode. The color of the film then changes from the dark blue characteristic of the oxidized polymer to red characteristic of the reduced polymer. The charge amount required for reducing the film which occupies an area of 1 $cm^2$ is 5.9 mC and that required for oxidizing it 6 mC. When voltage pulses are applied for modifying the optical spectrum, the response times are less than 100 ms. The number of oxido-reduction cycles which may be carried out is greater than $10^4$.

Figure 2:
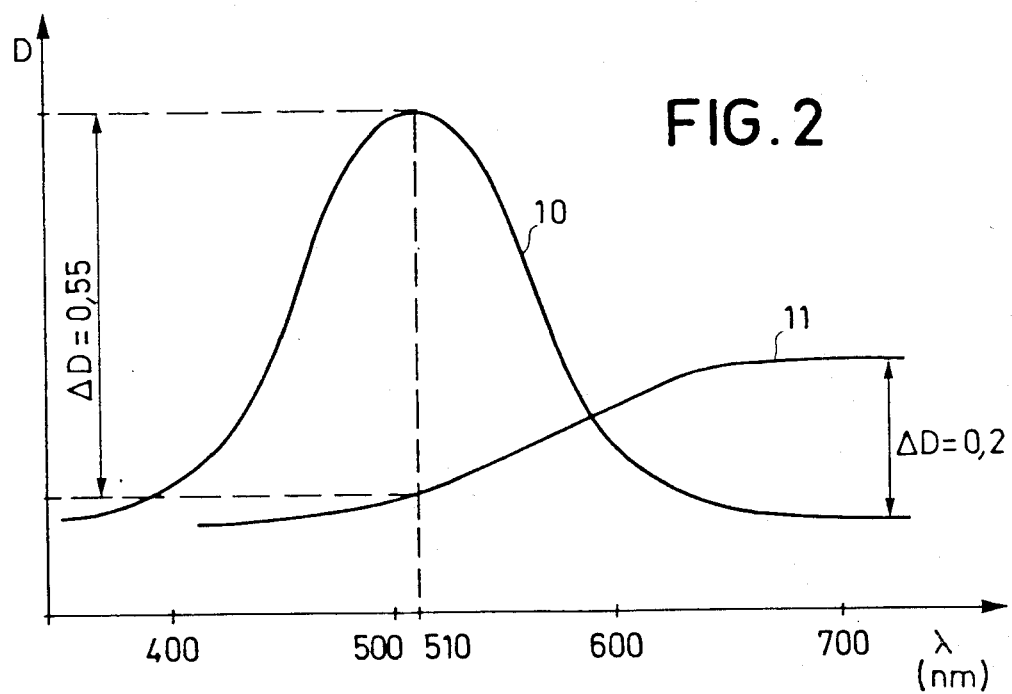
FIG. 2 is a $D=f(\lambda)$ diagram showing the optical density as a function of the wavelength for an oxide-reduction cycle of polymethyl-3-thiophene associated with the $ClO_4^-$ anion.

FIG. 2 shows the absorption spectra for the polymer during an oxido-reduction cycle. It is a diagram which represents the trend of the optical density D as a function of the wavelength λ of light. Curve 10 relates to the reduced polymer which is then red in color. Curve 11 relates to the oxidized polymer which dark blue. It can be seen that curve 10 presents a maximum for λ=510 nm and that it decreases substantially symmetrically on each side of this wavelength. Curve 11 presents a maximum for λ> about 650 nm and decreases with the wavelength. According to FIG. 2, it may be noted that for λ=510 nm, the optical density difference ΔD between curves 10 and 11 is ΔD=0.55 and that for λ>650 nm ΔD=0.2.

EXAMPLE 2

This example describes the color modification obtained when the nature of the counter-ion $X^-$ is changed from the monomer of example 1 for elaborating the polymer.

The products used for obtaining the polymer film are the same as before except for the electrolyte which is replaced by tetrabutylammonium hexafluorophosphate $N(Bu)_4{}^+Pf_6{}^-$ or by tetrabutylammonium tetrafluoroborate $N(Bu)_4{}^+BF_4{}^-$ in the same concentration. Under the same electrolysis conditions as before, a film of a thickness of 1500 Å is obtained.

The electrode coated with its polymer film is rinsed in acetonitrile then placed in another cell of the type shown in FIG. 1. This cell is filled with a solution containing the same electrolyte which served for elaborating the polymer film so as to conserve the optical properties of the film during the oxido-reduction cycles. The solution will contain then 0.1 mole of tetrabutylammonium hexafluorophosphate or tetrabutylammonium tetrafluoroborate for 1 liter of acetonitrile. The film is reduced then re-oxidized if a voltage first of all zero then equal to I V is applied between the working electrode and the reference electrode.

The absorption spectra of the oxidized and reduced forms and the charge amounts used are:

(a) for $X^-=PF_6{}^-$, blue-violet for the oxidized form (charge amount during oxidization 6 mC/cm²) and orange for the reduced form (charge amount during reduction 5.9 mC/cm²), (b) for $X^-=BF_4{}^-$, blue-green for the oxidized form (5.5 mC/cm²) and orange-red (5.4 mC/cm²) for the reduced form.

Figure 3:
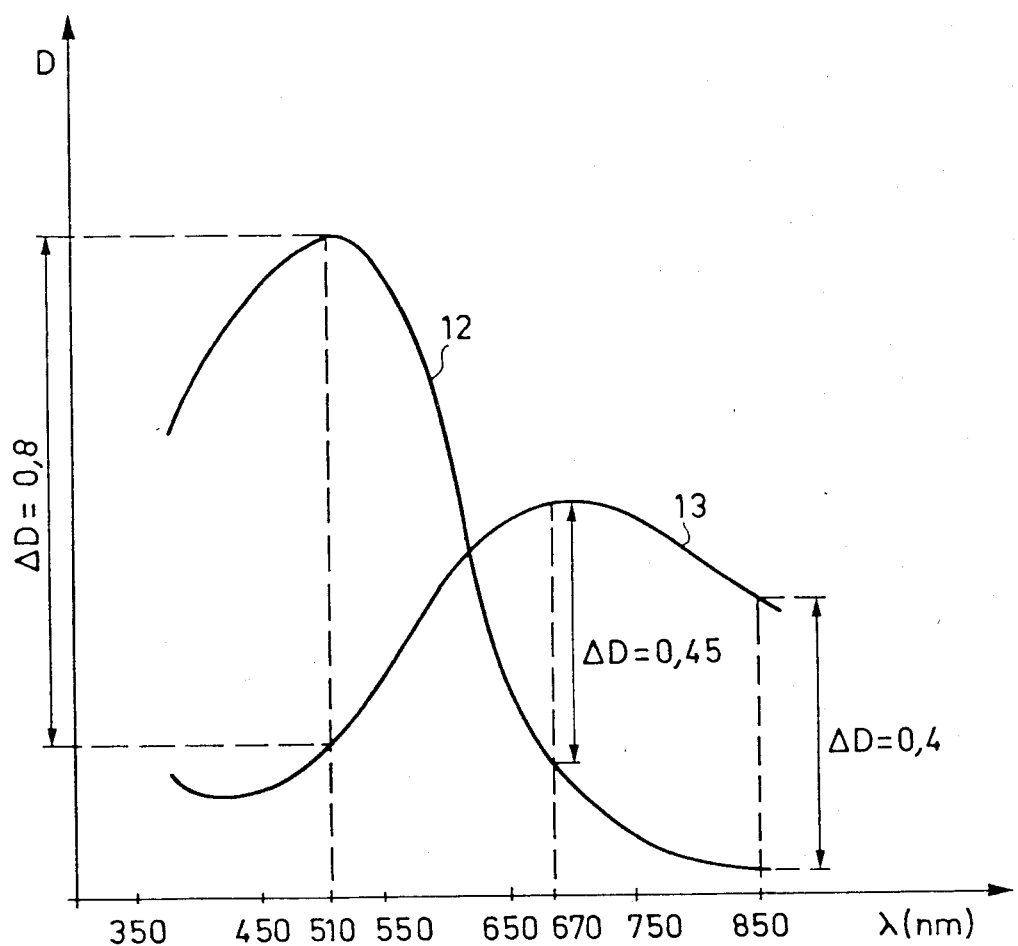
FIG. 3 is a $D=f(\lambda)$ diagram of polymethyl-3-thiophene associated with the $PF_6^-$ anion.

FIG. 3 shows the absorption spectra for the polymer of example 2 with $X^-=PF_6{}^-$. It is a diagram which shows the trend of the optical density D as a function of the wavelength λ of light. Curve 12 relates to the reduced polymer which is orange in color. Curve 13 relates to the oxidized polymer which is blue-violet. Curves 12 and 13 show a maximum respectively for λ=510 nm and λ=670 nm. For λ=510 nm, the optical density difference ΔD between curves 12 and 13 is ΔD=0.8, for λ=670 nm ΔD=0.45 and for λ=850 nm ΔD=0.4.

Figure 4:
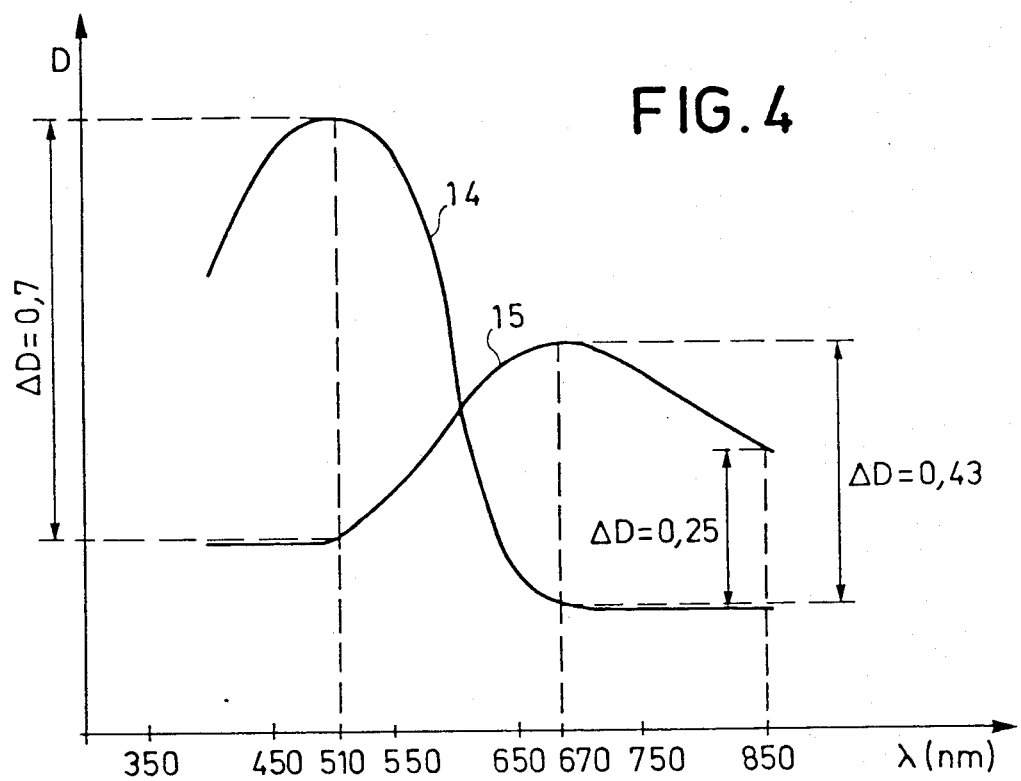
FIG. 4 is a $D=(\lambda)$ diagram of polymethyl-3-thiophene associated with the $BF_4^-$ anion.

FIG. 4 shows the absorption spectra for the polymer of example 2 with $X^-=BF_4{}^-$. It is a diagram which shows the trend of the optical density D as a function of the wavelength λ of light. Curve 14 relates to the reduced polymer which is orange-red in color. Curve 15 relates to the oxidized polymer which is blue-green in color. Curves 14 and 15 show a maximum respectively for λ=510 nm and λ=670 nm. For λ=510 nm, the optical density difference ΔD between curves 14 and 15 is ΔD=0.7, for λ=670 nm ΔD=0.43 and for λ=850 nm ΔD=0.25.

The table below shows the effects of different counter-ions coming into the structure of poly methyl-3-thiophene:

| Nature of the counter ion $X^-$ | Oxidized form | Reduced form |
|---|---|---|
| $ClO_4$ | dark blue | red |
| $PF_6$ | blue violet | orange |
| $BF_4$ | blue green | orange-red |

EXAMPLE 3

This example shows the influence of the basic monomer in the absorption spectrum of the polymer. The monomer of examples 1 and 2 was replaced by 5-cyanoindole of formula:

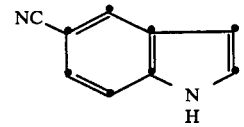

The synthesis of the polymer is achieved in the same way as that for methyl-3-thiophene with a potential difference of 1.4 V between the anode and the reference electrode. After a minute, there is obtained on the anode a polymer film of a thickness of 1000 Å in which is incorporated the $ClO_4{}^-$ ion coming from the electrolyte used (lithium perchlorate). The electrode coated with the poly 5-cyanoindole film is rinsed in acetonitrile. This electrode may then be used in an electrochemical cell of the type shown in FIG. 1. This cell is filled with a solution containing 0.1 mole of lithium perchlorate for 1 liter of acetonitrile. The film is reduced then re-oxidized if a voltage at first equal to 1 V then equal to 0.17 V is applied between the working electrode and the reference electrode. The color of the film changes then from green (oxidized form) to a whitish color (reduced form). The charge amounts used are 3.5 mC/cm² during oxidization and 3.5 mC/cm² during reduction.

Figure 5:
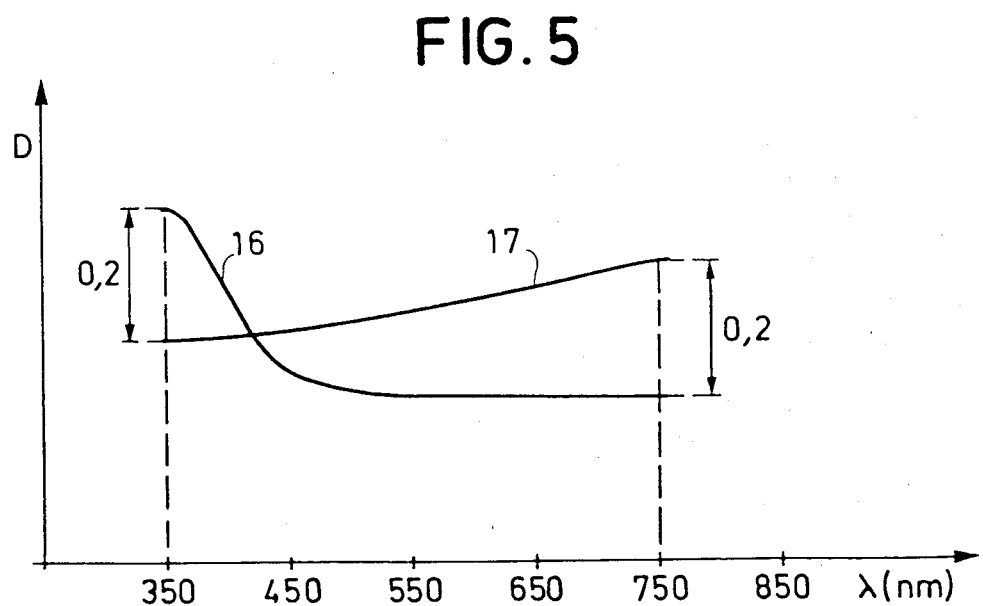
FIG. 5 is a $D=f(\lambda)$ diagram of poly 5-cyanoindole associated with the $ClO_4^-$ anion.

FIG. 5 shows the absorption spectra for the polymer of example 3 with $X^-=ClO_4{}^-$. It is a diagram which shows the trend of the optical density D as a function of the wavelength of light. Curve 16 relates to the reduced polymer which is whitish in color. Curve 17 relates to the oxidized polymer which is green in color. Curves 16 and 17 present a maximum respectively for λ=350 nm and λ=750 nm. For λ=350 nm, the optical density difference between curves 16 and 17 is ΔD=0.2, for λ=750 nm we also have ΔD=0.2.

What is claimed is:

1. An electrode comprising a conducting support coated with a polymer film obtained by electrochemical polymerization of at least one monomer M, said polymer corresponding to the general formula $(M^+X^-y)n$; $X^-$ representing an ion coming from the electrolyte used during said polymerization, y the anion proportion with respect to a mole of monomer and n the degree of polymerization, said monomer having one aromatic heterocycle containing a single hetero-atom said monomer being substituted by at least one substituent, wherein said monomer corresponds to the chemical formula:

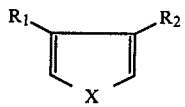

with: X=S or O,
wherein $R_1$ and $R_2$ are independently hydrogen alkyl, alkoxy, hydroxyl, aryl, substituted aryl, halogen, trihalogenomethyl, cyano, or dialkylamino wherein $R_1$ and $R_2$ are not both H.

2. The electrode as claimed in claim 1, wherein said electrolyte is a conducting salt of the $A^+X^-$ type in which the cation $A^+$ is an alkaline element, the $N(C_4H_9)_4^+$ ion or the $N(C_2H_5)_4^+$ ion and in which the anion $X^-$ is an anion such as $ClO_4^-$, $BF_4^-$, $PF_6^-$, $I^-$, $Br^-$ or:

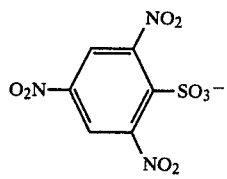

3. The electrode as claimed in claim 1, wherein said electrolyte used during said polymerization is in solution in an organic solvent such as acetonitrile, tetrahydrofuran, or methylene chloride.

4. The electrode as claimed in claim 1, wherein said conducting support is a metal plate.

5. The electrode as claimed in claim 4, wherein said metal plate is made from platinum.

6. The electrode as claimed in claim 1, wherein said conducting support is formed by a non conducting plate coated with a conducting layer.

7. The electrode as claimed in claim 6, wherein said conducting support is transparent.

8. The electrode as claimed in claim 1, wherein the polymer is obtained from two or more monomers.

9. An electrochemical cell, wherein one of the electrodes is formed by an electrode obtained in accordance with claim 1.

10. The electrochemical cell as claimed in claim 9, serving for accumulating and restoring energy by an oxido-reduction phenomenon.

11. An electrochemical display device using an electrochemical cell such as claimed in claim 9.

12. The display device as claimed in claim 11, wherein the color of said display may be modified by changing the nature of the electrolyte of said device.

13. An electrode comprising a conducting support coated with a polymer film obtained by electrochemical polymerization of at least one monomer M, said polymer corresponding to the general formula $(M^+X^-y)n$; $X^-$ representing an ion coming from the electrolyte used during said polymerization, y the anion proportion with respect to a mole of monomer and n the degree of polymerization, said monomer having one aromatic heterocycle containing a single hetero-atom, said monomer being substituted by at least one substituent, wherein said monomer is an indole substituted on the phenyl nucleus by at least one of the compound $R_3$, $R_4$, $R_5$, $R_6$, of the general formula:

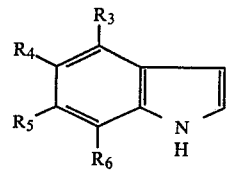

$R_3$, $R_4$, $R_5$ and $R_6$ being either hydrogen or a substituted such as alkyl, alkoxy, hydroxyl, aryl, substituted aryl, halogen, trihalogenomethyl, cyano, or amino.

14. The electrode as claimed in claim 13, wherein said electrolyte is a conducting salt of the $A^+X^-$ type in which the cation $A^+$ is an alkaline element, the $N(C_4H_9)_4^+$ ion or the $N(C_2H_5)_4^+$ ion and in which the anion $X^-$ is an anion such as $ClO_4^-$, $BF_4^-$, $PF_6^-$, $I^-$, $Br^-$ or:

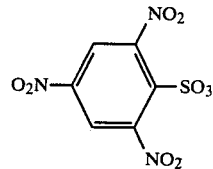

15. The electrode as claimed in claim 13, wherein said electrolyte used during said polymerization is in solution in an organic solvent such as acetonitrile, tetrahydrofuran, or methylene chloride.

16. The electrode as claimed in claim 13, wherein said conducting support is a metal plate.

17. The electrode as claimed in claim 16, wherein said metal plate is made from platinum.

18. The electrode as claimed in claim 13, wherein said conducting support is formed by a non conducting plate coated with a conducting layer.

19. The electrode as claimed in claim 18, wherein said conducting support is transparent.

20. The electrode as claimed in claim 13, wherein the polymer is obtained from two or more monomers.

21. An electrochemical cell, wherein one of the electrodes is formed by an electrode obtained in accordance with claim 13.

22. The electrochemical cell as claimed in claim 21, serving for accumulating and restoring energy by an oxido-reduction phenomenon.

23. An electrochemical display device using an electrochemical cell used as claimed in claim 21.

24. The display device as claimed in claim 23, wherein the color of said display may be modified by changing the nature of the electrolyte of said device.

* * * * *